Dec. 15, 1964　　　R. N. BURCKHALTER　　　3,161,589
BY-PASS ASSEMBLY FOR FILTERS
Filed Jan. 25, 1962　　　　　　　　　　　　　3 Sheets-Sheet 1
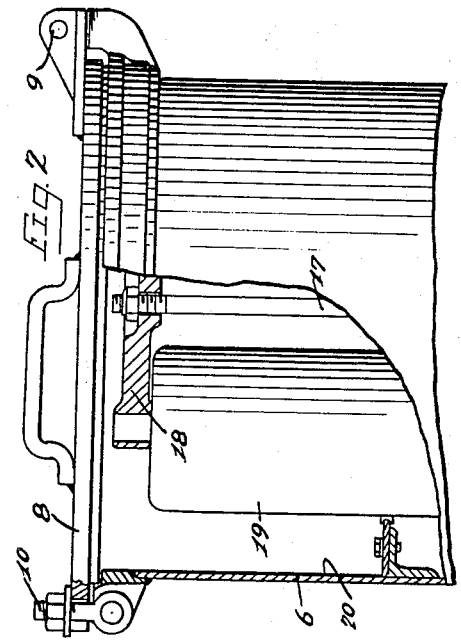
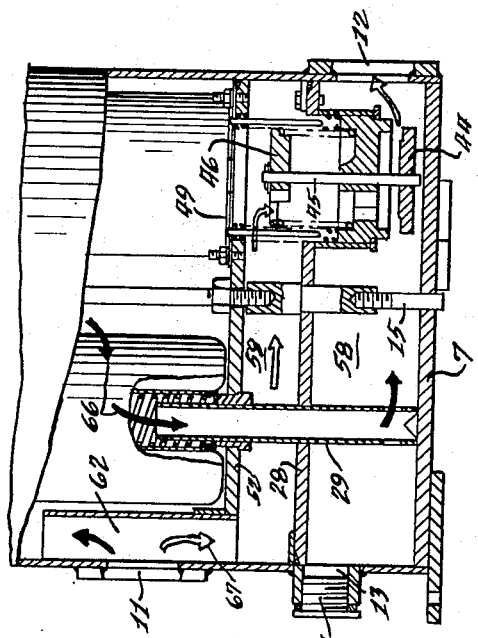
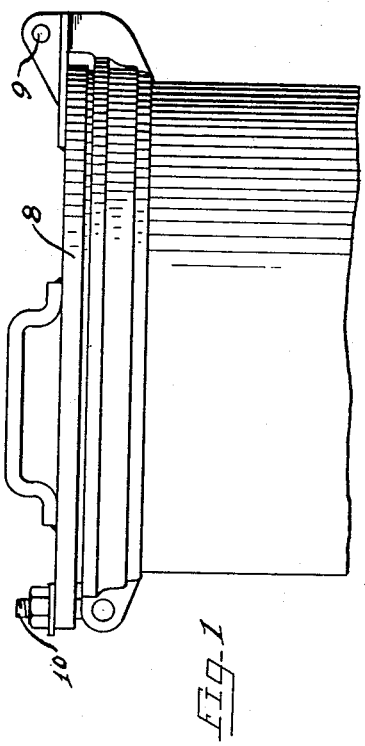
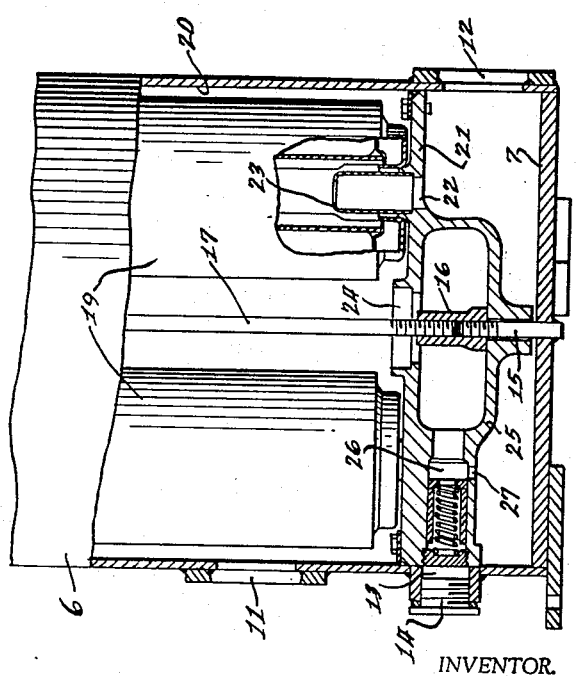
INVENTOR.
Robert N. Burckhalter
BY
Hill, Sherman, Meroni, Gross & Simpson
ATTORNEYS Dec. 15, 1964  R. N. BURCKHALTER  3,161,589
BY-PASS ASSEMBLY FOR FILTERS
Filed Jan. 25, 1962  3 Sheets-Sheet 2
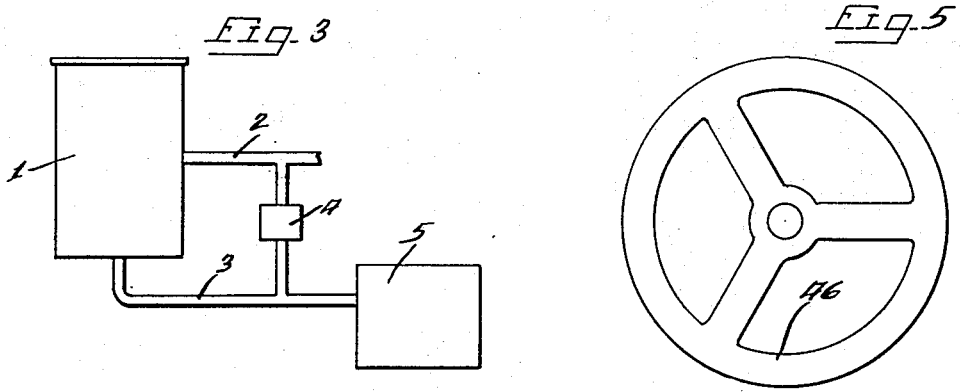
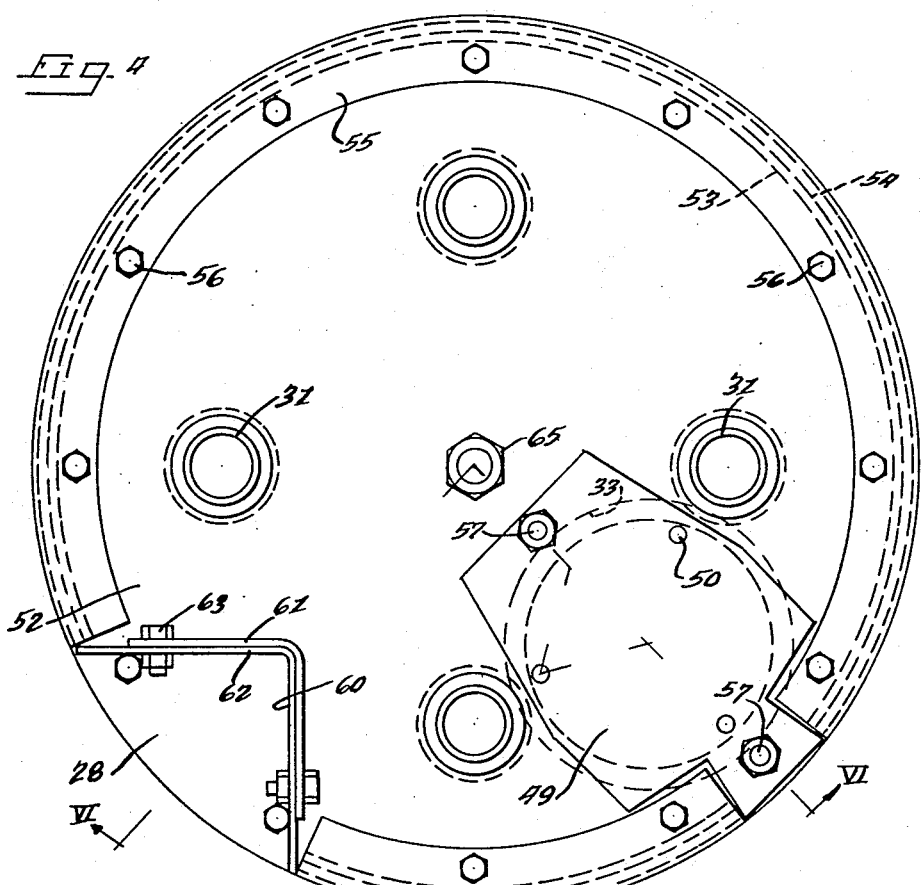
INVENTOR.
Robert N. Burckhalter
BY
Hill, Sherman, Meroni, Gross & Simpson
ATTORNEYS

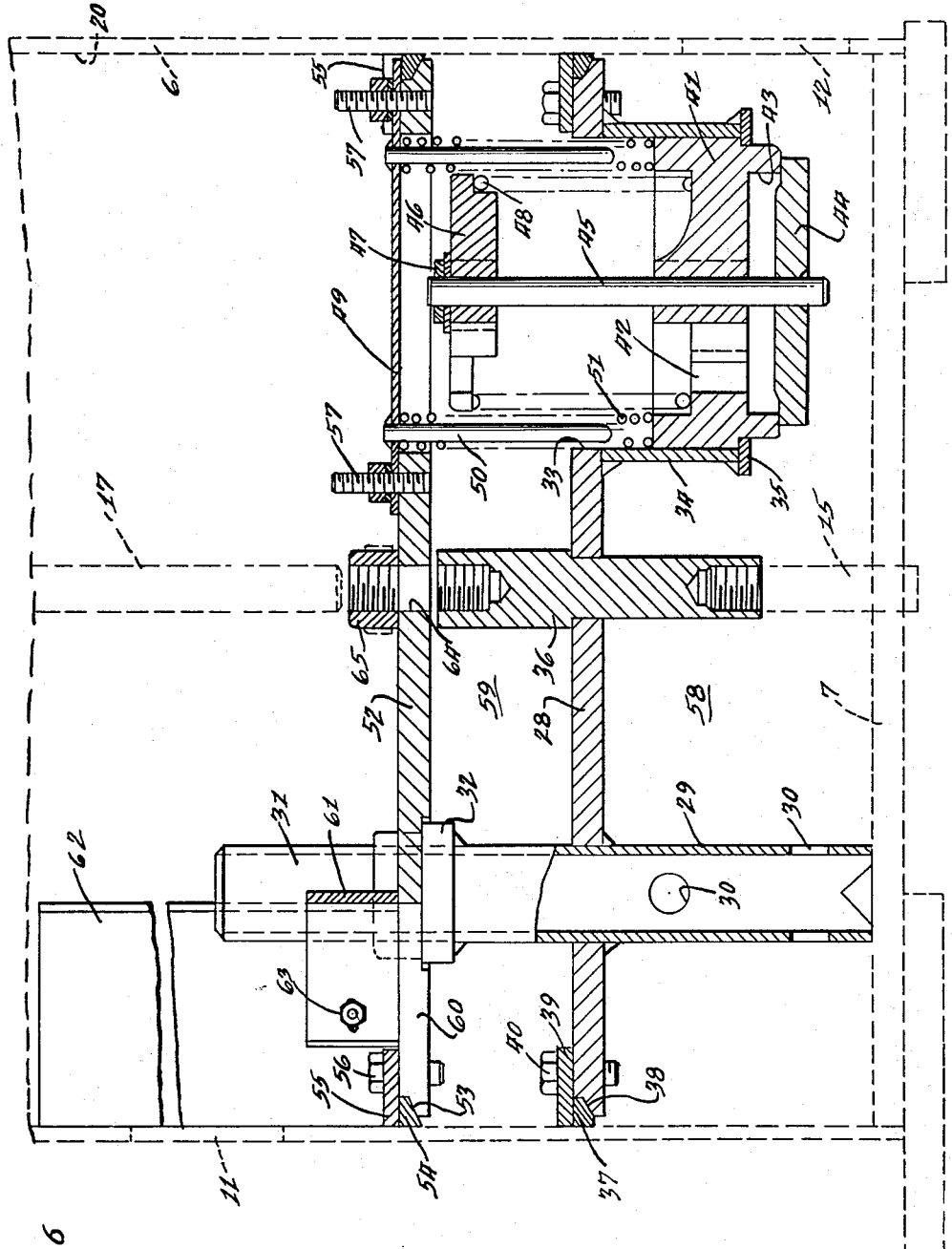

United States Patent Office 3,161,589
Patented Dec. 15, 1964

3,161,589
BY-PASS ASSEMBLY FOR FILTERS
Robert N. Burckhalter, Michigan City, Ind., assignor to Commercial Filters Corporation, Melrose, Mass., a corporation of New York
Filed Jan. 25, 1962, Ser. No. 168,726
1 Claim. (Cl. 210—130)

This invention relates to improvements in a by-pass assembly for filters, and more particularly to a by-pass assembly highly desirable for use in liquid filters, such as lubricant filters for example, the instant invention being readily installed in new filters at the time of their manufacture, or the invention may be used as a conversion kit and readily installed in filters already in use as a substitute for the by-pass assembly therein, although the invention may have other uses and purposes as will be apparent to one skilled in the art.

In the past, considerable difficulty has been experienced in the adequate filtration of various liquids under certain conditions. This was particularly true in connection with the filtering of lubricant oil for the power plants of vehicles such as diesel locomotives, diesel trucks and other automotive vehicles subject to considerable temperature variation. Usually multi-cartridge filters were utilized for this purpose, such filters comprising a casing in which a number of replaceable filtering cartridges are utilized, the number depending upon the horsepower of the engine or engines being serviced, the desired flow rate, capacity, and the like. The cartridges had filter media therein of different characters, in some instances pulverulent earth being utilized, while in others an inert cellulose type filter cartridge might be utilized, packed or wound around a central core, and in other cases pleated paper filter elements were used, among others. The main difficulty resided in the fact that the lubricant oil, when cold, could not be forced through the cartridges, but would be by-passed back to the engine or engines, and before the oil would pass through the cartridges it necessarily had to be heated. Such heating of the oil, of course, came from operation of the engine, but upon starting up the engine in cold weather, a period of operation was necessary in which practically no filtration of the lubricant oil occurred.

Formerly known filters of this type were objectionable, particularly with regard to the by-pass assembly and its location. In most instances, by-passing occurred from the filter compartment, and both sludge and contaminants from the walls of the filter cartridges were washed down along with the by-passed liquid and carried back to the engine. In other words, the lubricant oil was not only not filtered, but contaminants were actually added to it until a sufficiently high temperature was reached in the filter compartment for the oil to pass through the filter cartridges. The same additional contaminating of the oil would result in the event the filter cartridges became so loaded with contaminants that by-passing would result during normal operation. In other instances formerly known filters utilized by-pass means outside the filter casing or tank. While such structure avoided the washing of sludge and contaminants out of the filter compartment during by-passing, it nevertheless necessitated a highly objectionable length of time for the liquid in the filter compartment to become sufficiently heated to pass through the cartridges or filter elements.

With the foregoing in mind, it is an important object of the instant invention to provide a by-pass assembly for filters, which assembly is so arranged that liquid which is by-passed does not enter the filter compartment and so cannot wash contaminants off the filter elements or wash out sludge from the bottom of the compartment.

Also an important object of this invention is the provision of a by-pass assembly for filters, the assembly being so arranged that liquid which is by-passed does not enter the filter compartment, but at the same time transfers a goodly portion of its heat to the filter compartment.

A further object of this invention is the provision of a by-pass assembly that may readily be installed in a multi-cartridge filter in lieu of the by-pass assembly already therein, or may equally as readily be incorporated in a new filter during the manufacture thereof.

Another feature of this invention is the provision of a by-pass assembly for filters which may readily be substituted for the by-pass assembly in a filter already in use without disconnecting that filter or removing it from its installation, the substitution requiring a comparatively short period of time.

Still another object of this invention is the provision of a by-pass assembly for a filter, which assembly forms a floor for the filter compartment with the by-pass means located entirely below the floor so that by-passed liquid does not enter the filter compartment.

Still another object of the instant invention resides in the provision of a by-pass assembly for a filter, which assembly provides a floor for the filter compartment with the by-pass means disposed below that floor, and also includes a baffle adjacent the inlet to the filter tank which guides liquid to be filtered into the tank, and guides liquid away from the tank therebeneath if by-passing is in effect.

While some of the more salient features, characteristics and advantages of the instant invention have been above pointed out, others will become apparent from the following disclosures, taken in conjunction with the accompanying drawings, in which:

FIGURE 1 is a fragmentary part sectional, part elevational view of a filter having an old form of by-pass assembly therein;

FIGURE 2 is a fragmentary part sectional, part elevational view of the same filter casing or tank shown in FIGURE 1, but containing a by-pass assembly embodying principles of the instant invention;

FIGURE 3 is a fragmentary diagrammatic elevational view illustrating another old form of by-pass installation;

FIGURE 4 is an enlarged top plan view of the by-pass assembly of FIGURE 2;

FIGURE 5 is a plan view of a portion of the assembly; and

FIGURE 6 is a further enlarged vertical sectional view of my novel by-pass assembly taken substantially as indicated by the staggered section line VI—VI of FIGURE 4, looking in the direction of the arrows, and with the filter casing indicated in dotted lines.

As shown on the drawings:

In order to better present the instant invention and its advantages over filters as used heretofore, in FIGURE 1 there is shown a known and commonly used type of multi-cartridge filter, and in FIGURE 3 there is shown a known and old type of filter installation. Referring first to the old installation of FIGURE 3, it includes a filter 1 of any type to which is connected an inlet pipe 2 and an outlet pipe 3. Between the pipes 2 and 3 a by-pass assembly 4 is connected, this assembly being entirely outside the filter casing or tank. The outlet pipe 3 also leads to a cooler 5. With this arrangement it will be noted that an undue length of time is necessary for the oil to warm up after a cold start to the extent that it will pass through the elements in the filter 1. During that length of time substantially 100% of the oil is by-passed, and if the cooler is in operation, the time is still further extended before any filtered oil reaches the part to be lubricated.

A filter with a by-pass assembly more frequently used in the past is that shown in FIGURE 1. This filter embodies a tank or casing 6 having a bottom 7 and a cover 8 which is hinged to the casing 6 as indicated at 9 and tightened by means of a series of swing bolt assemblies 10. The casing 6 is provided with an inlet port or opening 11, and adjacent the bottom thereof with an outlet port 12. In the lower part thereof the casing is also provided with an access port 13, normally closed by a suitable plug 14.

Within the casing and extending upwardly from the center of the bottom 7 is a fixed bolt 15 to which a connecting nut 16 is secured and a through bolt 17 is also threadedly engaged with the connecting nut 16. As seen best in FIGURE 2, the through bolt 17 is engaged at the top with a spider 18 which bears down upon a plurality of filter cartridges 19 to hold the cartridges tightly in place within the tank 6. While the number of cartridges utilized depends upon the desired capacity of the filter, four cartridges have been illustrated by way of example. The cartridges 19 are disposed in a filter compartment 20 defined at the bottom by a plate 21 in the structure of FIGURE 1, which plate is a part of a by-pass assembly. The plate 21 is provided with an aperture 22 for each cartridge, and around that aperture is an upstanding nipple 23 over which the cartridge is seated. The plate 21 is also centrally apertured as at 24 to establish communication between the filter compartment and the interior of a housing 25 on the bottom of the plate, which housing is drilled out opposite the plugged opening 13 to permit the insertion of a spring urged by-pass valve 26 communicating with the space below the plate 21 and consequently with the outlet port 12 by means of a port 27 in the housing.

It will be noted that with a by-pass assembly of the character just above described in connection with FIGURE 1, all of the by-passed liquid comes from the filter compartment 20, and in passing through the opening 24 it will wash sludge from the compartment, accumulated on the plate 21, and also wash off contaminants from the sides of the filter cartridges and carry such sludge and contaminants through the outlet 12 back to the engine being lubricated.

While, as stated previously, the instant invention may be incorporated into a new filter during the manufacture thereof, I have elected herein to illustrate by way of example how it may be substituted for the adapter assembly shown in FIGURE 1, utilizing the same identical filter casing. As seen from the showing in FIGURE 2, the instant invention has been substituted for the adapter assembly of FIGURE 1 in the same filter casing, and after the substitution, the port 13 is merely maintained closed by the plug 14. The substitution may be made without disconnecting the filter of FIGURE 1 from the system, by draining the tank, removing the cartridges, and taking out the old adapter assembly, then substituting the new adapter assembly, replacing the cartridges, and again closing the casing cover. Such change-over can be accomplished in approximately one and one-half hours.

With reference now more particularly to FIGURES 4 and 6, the various specific parts of the instant by-pass assembly will be discussed in a convenient order for mounting them in the casing 6 after the removal of the by-pass assembly of FIGURE 1. The new assembly includes a separator plate 28 which extends entirely across the casing 6. This plate is provided with an aperture for each filter cartridge, and extending through the aperture is a pipe 29 rigidly secured to the plate 28, as by welding, and the pipe is provided with several spaced apertures 30 therein below the plate. As seen best in FIGURE 6, the pipes 29 rest upon the bottom 7 of the casing. The upper end 31 of each of the pipes functions as a nipple over which a filter cartridge is seated. Spaced a distance above the plate 28 each pipe is provided with a collar 32 therearound welded or equivalently secured to the pipe, which collars function as a base rest for a second plate to be later described.

At one point therein the plate 28 is provided with a relatively large aperture 33 and welded to the plate around the underside of this aperture is a depending cylinder 34 having a ring 35 secured to the bottom end thereof and extending inwardly in the manner of a flange. This cylinder 34 acts as a casing for a by-pass valve mechanism.

When installing the by-pass assembly in the casing 6, the plate 28 carrying the pipes 29 and the cylinder 34 is first placed into the casing with the pipes resting upon the casing bottom. Then a shouldered coupling member 36 having internal threads at both ends thereof is placed through a central aperture in the plate 28 and engaged with the bolt 15 fixed to the casing bottom, the shoulder on the coupling member holding the place 28 in fixed position. Thereafter this plate is sealed against the inner wall of the casing. This is accomplished by way of an annular gasket 37 seated upon a sloping circumferential shoulder 38 on the plate, the gasket being compressed so as to expand firmly against the inside wall of the casing by means of a gasket retaining ring 39 tightened against the gasket and plate by means of a plurality of bolts 40.

A by-pass valve arrangement is seated in the cylinder 34 through the opening 33 in the separator plate 28. The by-pass means include a base member 41 shouldered to seat firmly upon the ring flange 35 and provided with an aperture 42 therein. This member has a hollow in the lower end thereof defining a chamber 43 in communication with the opening 42 so that pressure is equalized on a valve 44 closing the lower end of the member 41. The stem 45 of the valve 44 extends through the base member 41 and also through a spider 46 disposed thereabove on the opposite side of which the valve stem is collared as indicated at 47. A coil spring 48 forces the spider 46 upwardly, tending to maintain the valve 44 in closed position over the lower end of the base member 41. A cover 49 is provided over the valve chamber and from this cover a plurality of rods 50 depend, around each of which is a coil spring 51 urging the base member 41 onto its seat on the ring flange 35 at the bottom of the cylinder 34.

Spaced above the separator plate 28 is a retainer plate 52 which seats upon the collars 32 on the pipes 29. This plate 52 also has a sloping circumferential shoulder 53 on which a gasket 54 is disposed and effects a seal against the inside casing wall by means of a segmented sealing ring 55 and a plurality of bolts 56 in the same manner as the seal is established between the plate 28 and the casing wall. The cover 49 over the by-pass valve is bolted to the plate 52 as indicated at 57—57.

With the gaskets 37 and 54 compressed into sealing engagement with the inside of the casing 6, it will be noted that the plate 28 defines an outlet chamber 58 between itself and the bottom of the casing in communication with the casing outlet port 12. The only communication to that outlet chamber is by way of the apertures 30 in the pipes 29 which admit filtered liquid into the outlet chamber, and by way of the by-pass valve 44. The plate 52 defines between itself and the plate 28 a by-pass chamber 59, the only exit from which is by way of the by-pass valve 44, and the only entrance to which is by way of a V-shaped notch 60 in the plate 52 which establishes communication between the by-pass chamber 59 and the inlet port 11. Adjacent this notch there is an upstanding V-shaped bracket 61 secured to the plate 52, and an upstanding baffle 62 is bolted to the bracket 61 as indicated at 63. This baffle is disposed directly inside the inlet port 11 to the casing 6 and entering fluid must necessarily strike the baffle.

After the plate 52 is mounted in position, and the baffle connected thereto, it is a simple expedient to engage the through bolt 17 through an opening 64 in the plate 52 with the upper end of the connector 36, a nut 65 preferably being provided to insure holding the through bolt in position. It can therefore be seen that the entire by-pass valve assembly is readily installed in a comparatively short time in a filter casing in lieu of the by-pass assembly previously therein.

In operation, the instant invention is highly effective for the intended purposes. In FIGURE 2 the flow of liquid through the filter compartment is indicated by solid arrows 66, and the flow of liquid being by-passed is indicated by the skeleton arrows 67. It will be especially noted that entering liquid strikes the baffle 62 and will pass upwardly over the top of that baffle into the filter compartment until that compartment is filled. If the liquid is of sufficiently high temperature it will pass through the filter cartridges and down into the outlet chamber 58 by way of the pipes 29 and exit through the outlet port 12 back to the engine being lubricated. However, if the oil or other liquid is too cold to pass through the filter cartridges 19, it will descend inside the baffle 62 after the filter compartment 20 is full, passing through the by-pass chamber 59 and through the by-pass valve 44 which is shown in open position in FIGURE 2 and exit through the outlet port 12.

Assuming the liquid in the filter compartment is too cold to pass through the filter elements, it will be noted that the by-passed liquid coming from the engine contacts the baffle, and the underside of the plate 52, and transfers a goodly portion of its heat through the baffle and plate to the liquid in the filter compartment immediately adjacent the filter cartridges. Thus, filtration of the lubricant is established in a very short time from a cold start.

If the filter cartridges are so contaminated that liquid will not flow therethrough rather than overcome the pressure of the spring 48 acting on the by-pass valve, or if the lubricant in the filter compartment is too cold to pass through the filter cartridges, it will be noted that none of the by-passed lubricant will enter the filter compartment but will descend inside the baffle into the by-pass compartment. Consequently that lubricant cannot wash sludge out of the filter compartment, nor can it wash contaminants off the side walls of the filter cartridges. While such liquid is being by-passed and not filtered, nevertheless there are no contaminants added to it, as was the case with most filters heretofore utilized.

It will be understood that modifications and variations may be effected without departing from the scope of the novel concepts of the present invention.

I claim as my invention:

A filter having a bottomed casing with an inlet port substantially above the bottom and an outlet port adjacent to the bottom, (a) said casing defining a filtering compartment provided with filtering means therein, (b) separator means sealingly related to the casing and defining with the casing bottom an outlet chamber communicating with said outlet port, (c) retainer means sealingly related to the casing and spaced above said separator means and providing a bottom for the filtering compartment below the filtering means and defining a by-pass chamber between itself and said separator means, (d) tubular filtrate outlet means extending through both of said separator and retainer means and discharging into said outlet chamber beneath said separator means, (e) said separator means having a by-pass opening therethrough from said by-pass chamber into said outlet chamber, (f) closingly biased by-pass valve means normally closing said by-pass opening, (g) said retainer means having an opening therethrough adjacent to said inlet port, (h) and means including a baffle connected to the retaining means about said opening through the retaining means and opposing said inlet opening to guide incoming fluid to be filtered upwardly to a substantial height above the retainer means into the filtering compartment and to guide by-pass flow into said by-pass chamber without flowing into the filtering compartment, and forming a barrier between said inlet port and the filtering compartment against by-pass flow from said inlet port reaching the top of said retainer means directly, whereby by-pass fluid flow cannot wash contaminants and sludge from above the retainer means into the by-pass chamber.

References Cited in the file of this patent
UNITED STATES PATENTS

| | | |
|---|---|---|
| 2,369,857 | Russell et al. | Feb. 20, 1945 |
| 2,401,039 | Bauer | May 28, 1946 |
| 2,773,602 | Sylvester | Dec. 11, 1956 |